UNITED STATES PATENT OFFICE.

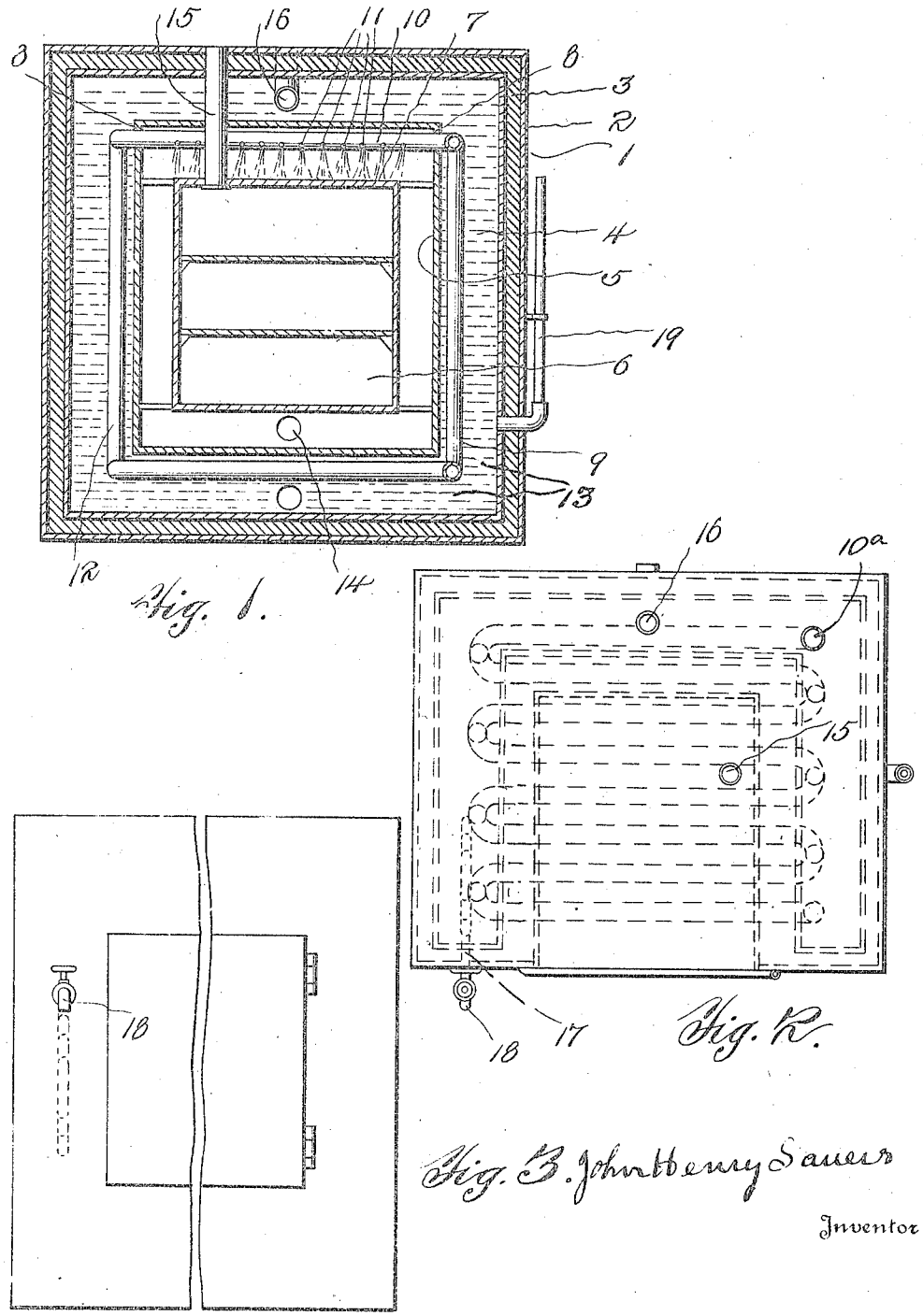

JOHN HENRY SAUERS, OF CAMDEN, NEW JERSEY.

REFRIGERATING DEVICE.

1,264,866.  Specification of Letters Patent.  Patented Apr. 30, 1918.

Application filed August 8, 1916.  Serial No. 113,699.

*To all whom it may concern:*

Be it known that I, JOHN HENRY SAUERS, a citizen of the United States, residing at Camden, in the county of Camden and State of New Jersey, have invented certain new and useful Improvements in Refrigerating Devices, of which the following is a specification.

This invention relates to refrigerating devices and has for its object to provide an iceless refrigerator.

Another object of the invention is to provide a refrigerator receptacle having means for spraying water thereon.

With the above and other objects in view, which will be more fully explained in the following specification, I have invented the device illustrated in the accompanying drawings, in which—

Figure 1 is a vertical sectional view of my refrigerator,

Fig. 2 is a top plan view thereof, and

Fig. 3 is a front elevation thereof.

Like reference characters indicate like parts throughout the following specification and in the several views in the drawings, in which 1 indicates my device which consists of a casing 2 having an inner asbestos lining 3 within which is a liquid containing tank 4. Suspended centrally and between the inner walls 5 of the tank 4 is a food compartment 6, said walls 5 having their upper edges 8 terminate slightly above the top 7 of the compartment 6.

Coiled through the chamber 4 and around the compartment 6 in any suitable manner is a water pipe 9 having an inlet 10ᵃ the upper horizontal portions 10 of said pipe being perforated with very small holes 11 whereby water circulating through said pipe sprays through said perforations 11 upon the top 7 of the food compartment 6 from whence it flows all around said receptacle thoroughly cooling the same, the water then passes out through the drain 14. A ventilator pipe 15 extends through the chamber 8 and into the food compartment whereby the contents are kept sweet and fresh. 16 is an inlet port for the liquid 12. A drinking water pipe 17 is also coiled through the chamber 8 whereby drinking water may be kept cool, the pipe connects with the faucet 18. An indicator 19 connects with the interior of the chamber 8 so that the amount of liquid therein may always be seen.

The liquid 13 forms a non-conductor of heat and it may be renewed from time to time as required. Cool water is kept flowing through the coils 9 and from there is sprayed upon the walls of the compartment 6 keeping the same cool.

Having described my invention, that which I claim to be new and desire to obtain by Letters Patent is:

1. The described device consisting of an outer and an inner casing between which a liquid container is formed, a compartment within the inner casing and means for spraying liquid thereon.

2. The described device consisting of an outer and an inner casing between which a liquid container is formed, a compartment within the inner casing and means for spraying liquid thereon, said means consisting of a coil pipe for conveying said spraying liquid.

3. A refrigerator consisting of a casing, a tank therein and a food container suspended in the tank and water pipes coiled around the container, said pipes having openings arranged to permit water to drip on said container.

4. The described device consisting of an outer and an inner casing between which a liquid container is formed, a compartment within the inner casing and means for spraying liquid thereon, said means consisting of a coil pipe for conveying said spraying liquid, said pipes being coiled about said inner casing.

5. The described device consisting of an outer casing, a compartment therein and means for spraying water upon said compartment and a liquid container between said casing and said compartment said means consisting of a perforated pipe coiled above said compartment and a chamber formed between said container and said compartment in which said coils are located.

6. The described device consisting of an outer casing, a compartment therein and means for spraying water upon said compartment, a liquid container between said casing and said compartment, said means consisting of a perforated pipe coiled above said compartment and a chamber formed between said container and said compartment in which said coils are located, said chamber having an outlet.

7. The described device consisting of an outer casing, a compartment therein and means for spraying water upon said compartment, a liquid container between said casing and said compartment, said means consisting of a perforated pipe coiled above said compartment, a chamber formed between said container and said compartment in which said coils are located, said chamber having an outlet and a ventilator extending from the compartment through the walls of said casing.

8. The described device consisting of an outer and an inner casing between which a liquid container is formed, a compartment within the inner casing and means for spraying liquid thereon, said means consisting of a coil pipe for conveying said spraying liquid, said pipes being coiled about said inner casing and a conductor pipe leading from said inner compartment.

9. The described device consisting of an outer and an inner casing between which a liquid container is formed, a compartment within the inner casing and means for spraying liquid thereon, said compartment being spaced apart from the walls of said inner casing.

10. The described device consisting of an outer and an inner casing between which a liquid container is formed, a compartment within the inner casing and means for spraying liquid thereon, said compartment being spaced apart from the walls of said inner casing and a ventilator for said compartment.

In testimony whereof I affix my signature in the presence of two witnesses.

JOHN HENRY SAUERS.

Witnesses:
  WALTER J. FARRELL,
  NORMAN W. MUNYON.